Dec. 9, 1969
F. D. WERNER
EXTRUDER PRESSURE SENSOR
Original Filed April 28, 1967
3,482,449
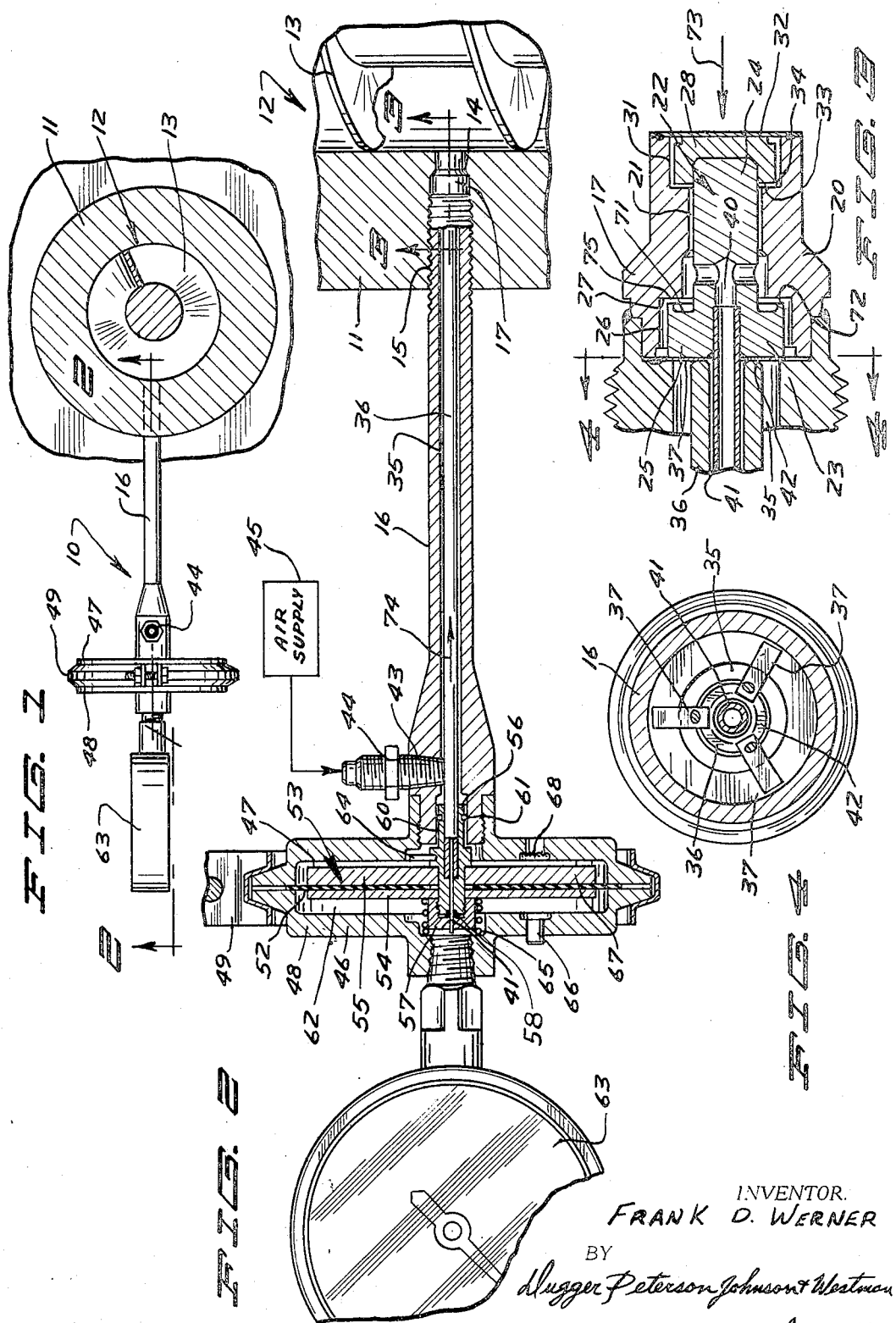
INVENTOR.
FRANK D. WERNER
BY
Dugger Peterson Johnson & Westman
ATTORNEYS United States Patent Office 3,482,449
Patented Dec. 9, 1969

3,482,449
EXTRUDER PRESSURE SENSOR
Frank D. Werner, Minneapolis, Minn., assignor to Rosemount Engineering Company, Minneapolis, Minn., a corporation of Minnesota
Continuation of application Ser. No. 634,578, Apr. 28, 1967. This application Dec. 10, 1968, Ser. No. 782,593
Int. Cl. G01l 7/08
U.S. Cl. 73—406    20 Claims

ABSTRACT OF THE DISCLOSURE

A pressure sensor including a first diaphragm flush mounted in an extruder housing. Deflections of the diaphragm are transmitted to a regulating valve which controls the flow of a pressurizing fluid from a regulated supply to a second diaphragm connected to the regulating valve which effects rebalance, whereby the degree of pressurization of the second diaphragm is measured as an indication of the extruder pressure.

CROSS REFERENCE TO OTHER APPLICATION

This application is a continuation of my co-pending application Ser. No. 634,578, filed Apr. 28, 1967, now abandoned.

BACKGROUND OF THE INVENTION

Field of the invention

The present invention relates to pressure sensors which can be used for measuring high pressures in a hot medium with accuracy and without using delicate, easily damaged equipment.

Description of the prior art

One of the problems of the measurement of extruder pressures is that the temperatures are extremely high, running in the order of 700° F. or more, and the pressures, also, are extremely high, often on the order of 10 to 15 thousand pounds per square inch. This means that an ordinary pressure sensor cannot be used for direct readings. Also, it means that the indicating instruments must be remote from this hostile environment. Moving an indicating instrument away from the sensing area complicates the problem of obtaining accuracy.

Sensors using plungers that go into the material cannot be used for several reasons, including the fact that extruders normally use screw type extruding members that would damage any plunger.

The variation in temperatures between the place where sensing takes place and the temperatures where the reading takes place is another problem that effects the accuracy of measurements.

Patent No. 2,883,995 shows a force balance pressure sensor, but this is for use in systems where the primary sensing diaphragm does not have to be flush with the wall of an extruder barrel. This device as shown is for use with liquid metals. The force balance diaphragm in this patent is also close to the hostile environment and the regulating valve is actually within a chamber formed by the force balance diaphragm.

Patent No. 3,277,721 shows a pressure sensor for use with extruders but it appears to require extreme manufacturing accuracy to be operable and is not a closed loop force balance system. Further the device shown in Patent No. 3,277,721 would appear to have poor accuracy over the normal temperature range for these devices in that changes in temperature of the sensed fluid does not affect all of the metering assembly in the same manner.

SUMMARY OF THE INVENTION

The present invention discloses a pressure sensor for use primarily in plastic extruders and in other areas where high temperatures and high pressures are encountered.

The unit utilizes a force balance system which is really a closed loop pressure sensing system having two diaphragms. A first diaphragm is positioned to sense pressure in the hostile environment and controls movement of a regulating valve. The regulating valve in turn regulates flow from a source of fluid under pressure to a second diaphragm. The second diaphragm is mechanically connected to the valve as well and an increase in pressure at the second diaphragm will cause opening of the valve to be resisted until a force balance is arrived at.

In the present invention the regulating valve is located adjacent to the primary sensing diaphragm so that it is subjected to the same temperature as the sensing diaphragm. Having the valve close to the diaphragm eliminates problems caused by expansion of the actuator rod under high temperatures and strain of the rod under high pressures. This insures accuracy of the unit at different operating temperatures. The force balance diaphragm is remote from this high temperature environment so it is easier to make and assemble. The force transfer rod between the two diaphragms is made so it does not bind and is otherwise unaffected by environmental factors. The unit is easily made, easily installed, and does not require critical installation adjustments. An over-pressure stop to prevent damage is also provided.

It is therefore broadly an object of this invention to provide pressure sensing means to permit the measurement of high pressures in high temperature environments with good accuracy at reasonable economy.

BRIEF DESCRIPTION OF THE DRAWINGS

FIGURE 1 is a side elevational view of a pressure sensor made according to the present invention and schematically shown installed in the wall of a plastic extruder;

FIGURE 2 is a fragmentary enlarged sectional view taken as on line 2—2 in Figure 1;

FIGURE 3 is a fragmentary enlarged sectional view taken as on line 3—3 in FIGURE 2; and FIGURE 4 is a sectional view taken as on line 4—4 in FIGURE 3.

DESCRIPTION OF THE PREFERRED EMBODIMENT

Referring to the drawings and the numerals of reference thereon, the extruder pressure sensor illustrated generally at 10 is mounted into a wall 11 of the barrel of a plastic extruder 12. The extruder 12 includes an inner helical screw 13 that is used for mixing and forcing the plastic material through the interior chamber formed by the tubular wall 11. The screw, of course, is power driven in the usual manner.

In the use of extruders shown typically in FIGURE 1, the internal pressures within the tubular wall 11 range in the order of ten to fifteen thousand pounds per square inch and the temperatures are in the neighborhood of 700° F. to 800° F.

The wall 11 of the extruder has an opening 14 extending therethrough. The outer portions of the opening are threaded as at 15 to receive a housing stem 16 of the sensor 10. As shown, the housing stem 16 is elongated and tubular. The housing stem 16 has a sensing assembly 17 attached to the end thereof and which is inserted into the opening 14. The sensing assembly 17 includes a body member 20 that has an irregular shaped center opening 21. The center opening 21 is used for housing a regulating valve and pressure transfer assembly 22.

The regulating valve and pressure transfer assembly 22 includes a main valve body 23 which comprises a stem 24 and an enlarged valve head 25. The valve head 25 is of larger diameter than the stem and fits within a recess 26. A valve shoulder surface 27 is formed between surfaces defining recess 26 and the center part of opening 21. The opposite end of the stem 24 has a cap 28 fixed thereto and this cap 28 is also of larger diameter than the center portion of the opening 21. The cap fits within an outer end recess 31. A thin, deflectable stainless steel diaphragm 32 is spot welded to the outer surface of the cap 28 and is also welded at its periphery to the outer surface of the body 20 forming a hermetic seal for the sensing portion.

The inner end of the cap 28 has a surface 33 which is annular and surrounds the stem 24. This surface 33 is of size so that it will collide with a surface 34 forming a stop shoulder surface which joins the recess 31 with the center portion of the opening 21.

As stated previously, the sensing assembly 17 is fixed to the end of the housing stem 16. The housing stem is tubular as shown, and has a center passageway 35. Inside this passageway a force transfer rod 36 is freely slidably mounted. The force transfer rod 36 is of smaller diameter than the passageway 35 and extends throughout the length of the passageway. The force transfer rod itself is not directly attached to the valve head 25 but does transfer force to this valve head.

Three small angularly spaced, radially extending flexible strips 37 are spot welded to the outer surface of the valve head 25 and the outer ends of the strips are spot welded to the housing and serve to center the valve head inside the opening 26. This prevents the valve head from shifting from side to side. The strips are flexible enough to allow the valve to move as necessary for normal operation.

The force transfer rod 36 abuts against the alignment strips, and thus against the valve head 25. The force transfer rod is also tubular and a tube 41, which is fixed to the valve body 23, extends through the opening in the force transfer rod to the remote end of the instrument. The tube 41 is slidably mounted inside this force transfer rod.

As can be seen, the end surface of the force transfer rod which abuts against the alignment strips 37 is rounded as at 42 so that there can be a slight cocking of the force transfer rod with respect to the head 25 without causing binding.

The housing stem 16 is elongated and its center opening or passageway 35 is of larger diameter than the force transfer rod 36. A port 43 having a fitting 44 opens into the passageway 35 and this port is connected to a regulated source of air (fluid) under pressure indicated schematically at 45. This source of air under pressure is normally at substantialy 45 pounds per square inch gauge and passes through a suitable regulator to maintain this pressure.

Adjacent the remote end of the housing stem 16 is a housing section 46 provided for housing a diaphragm of substantially larger diameter than the housing stem 16. The housing section 46 is formed in two parts so that the unit can be assembled and this includes a base part 47 and an outer part 48 held together with a clamping ring 49 that can be tightened down to hold them together. A diaphragm 52 is positioned between the two sections 47 and 48 and is clamped between the two sections around its periphery when the clamp 49 is tightened. The diaphragm is sealed around its periphery by this clamping action.

The diaphragm 52 has sufficient flexibility so that it can deflect back and forth inside the housing transverse to the plane thereof. A piston assembly illustrated generally at 53 is clamped onto and moves with the diaphragm. The piston assembly includes a pair of disc-like members 54 and 55 positioned on opposite sides of the diaphragm and clamped against it. The members are held onto the diaphragm with a piston sleeve 56 that passes through an aperture in the dis-like members and the diaphragm and which is threaded to receive a nut 57 on the outer side of the diaphragm. As can be seen, the piston sleeve 56 is shouldered so that it contacts the member 55 and the nut 57 contacts the member 54.

The piston sleeve 56 is slidably mounted in a counter bore that is open to but larger than the passageway 35. An O-ring 61 seals the piston sleeve with respect to this counter bore. The piston sleeve is mounted on and moves with the force transfer rod 36. The tube 41 extends through the force transfer rod and up through an opening in the piston sleeve 56, and through a provided opening in the cap 57 so that the center of the tube 41 opens into a chamber 62 on the side of the diaphragm away from the first diaphragm 32. The tube 41 is sealed with respect to the sleeve 56 with an "O-ring" 58.

The piston sleeve 56 has a small radically extending pin 64 inserted therein and this fits within a provided pocket in the housing member 47 to prevent the force transfer unit from rotating about its axis when it is installed. In addition, a small spring 65 is provided between the housing member 46 and the disc-like member 54 to balance the unit at zero pressure.

The chamber 62 is vented through adjustable exit orifice shown schematically at 66 so that there is a flow of fluid under pressure from this chamber, but the amount of flow can be controlled.

A chamber 67 formed on the opposite side of the diaphragm from the chamber 62 is vented to the atmosphere through a port 68 that has a screen cover.

The valve body 23 is counterbored to receive the tube 41 and has a passageway 40 defined therein that is open to the interior of the tube 41 and also opens through cross bores to the center opening 21 in the body member 20. This opening is of larger diameter than the stem 24. An annular recess 71 is defined in the head member 25 around the shank 24 and this leaves a small annular lip forming a valving surface 72 that is positioned adjacent the shoulder 27.

In operation, air is supplied from supply 45 through the port 43 into the passageway 35. Because of the O-ring 61, the air cannot pass out past the piston sleeve 56. The air under pressure in the passageway 35 also enters the annular valve recess 26. If the valve surface 72 is spaced from the shoulder surface 27, as shown in FIGURE 3, because of the pressure acting in direction as indicated by the arrow 73, the air under pressure will flow in this space between the two surfaces, into the main opening 21 (which is relieved slightly at the top end) through the passageway 40 in stem 24 and into the interior of the tube 41. This will cause the pressure in chamber 62 to increase by an amount predictable by the area ratio of the exit orifice over inlet size and the supply and ambient pressures. If the valve opening is very large (ten times the exit orifice) then the pressure in chamber 62 is nearly equal to the supply pressure of 45 p.s.i. The pressure in the chamber 62 will act upon the diaphragm 52 forcing the diaphragm, the piston sleeve 56, and the force transfer rod 36 to move in direction as indicated by the arrow 74 (FIGURE 2). This will tend to move the valve disc 25 in this same direction (or resist movement in opposite direction) causing the small opening which is indicated at 75 to become smaller, tending to reduce the flow of air through this opening. Because of the orifice 66 there is a flow through the chamber 62. Thus slightly closing the regulating valve tends to reduce the pressure in the chamber 62.

The pressure in the chamber 62 is recorded on the gauge 63 and by proper calibration, this can be directly read as the pressure on the diaphragm 32 acting in direction as arrow 73. The gauge can be mounted remotely as well as direct.

The reduction of the air flow by slight closing of the regulating valve through the force rod will then reduce the force exerted by diaphragm 52 on the rod because of the reduction in pressure in chamber 62. When the force tending to move the valve toward its seat under the urging of the pressure in chamber 62 and the force on the diaphragm 32 tending to move the valve away from its seat are equal, the system will reach an equilibrium and air will continue to flow through the passageway 35, the opening 75, passageway 40, tube 41 into the chamber 62 and out through the orifice 66 at this balancing pressure. Then the reading on gauge 63 is proportional to the pressure on diaphragm 32.

Any reduction in pressure (or force) on the diaphragm 32 will cause the unit to seek a new equilibrium. The pressure in the chamber 62 necessary to move the regulating valve to an equilibrium will be less, and this of course will be reflected on the gauge 63. Any increase in pressure on the diaphragm 32 will cause the surface 72 to tend to move away from the shoulder surface 27 causing a greater pressure in the chamber 62 and a greater flow of air into this chamber. More force is then necessary to return the regulating valve to equilibrium. This too will be shown up as a change in the gauge pressure in gauge 63.

In case of a larger pressure acting in direction as indicated by arrow 73 which exceeds the limit of the pressure sensor, the surfaces 33 and 34 will collide providing a mechanical stop so that the diaphragm 32 will not be damaged nor will the rest of the mechanism. In addition, there are some other points that should be noted that make the operation of this unit satisfactory. If the long housing extension 16 tends to warp slightly the force transfer rod end surface 42 can cock slightly where it bears against the spring fingers 37 without causing any binding of the stem 24 or the disc 25. There is a space between the tube 41 and the passageway inside the force transfer rod for this tube to avoid binding. The O-ring 58 prevents escape of air through this space however.

It should be noted that the valve surfaces 72 and 27 which together control the size of the valve opening 75, are exposed to the same temperature, or substantially the same temperature as the diaphragm 32. The valve parts are located within the wall of the extruder or in good heat conducting relation thereto. This means that the critical regulating valve will be at the temperature of the diaphragm itself. Because of the standard acceptable small size of the diaphragm 32 it cannot deflect more than a few mils. Hence the valve seat must be close to the diaphragm to minimize temperature and pressure strains between the diaphragm and the position controlling valve. If the valve were at the large end the length of the actuating rod would be so long that the thermal expansion would affect the valve opening significantly. This would mean that the rebalance force from the large diaphragm would be erroneous and could cause the little diaphragm to fail. Also if the valve body opened too far, it could become mechanically stopped. Further lengthening of the actuating rod would break the small diaphragm. An analogous but reversed situation would arise with a long rod under high forces because the rod would compress enough to shorten and change the valve setting.

If desired, the pressure sensor can be used with limit arm contacts mounted within the Bourdon tube gauge, or can be used with a pressure switch so that when the pressure exceeds a certain amount, an alarm will sound, or when the pressure decreases to a certain level, an alarm will sound. While a gauge 63 has been shown for purposes of simplicity, it should be understood that other pressure indicators attached or remote can be used as well.

The unit is not position sensitive. It can be mounted in the most convenient position on the extruder barrel or wall.

The unit is extremely simple to make and can be easily assembled. The design is rugged, and it can take warpage to a certain extent as well as external blows. The amount or torque exerted on the instrument in fixing it to the extruder barrel or wall 11 is not critical because the stresses in this section of the housing extension having only a small effect on the position of the critical sensing and regulating valve elements. A direct force balance air pressure system gives great reliability, high accuracy and because the metering or regulating valve is in the same environment as the sensing diaphragm the temperature of operation does not adversely effect the reliability of the unit.

The movement of the sensing diaphragm is very slight in operation. Full opening of the regulating valve occurs upon deflection of a few mils. Normal operation may cover a deflection range of diaphragm 32 of a fraction of a mil.

What is claimed is:

1. A pressure sensor including a housing, means at a first end of said housing comprising a first diaphragm in position to be deflected from its normal plane due to pressure to be sensed, movable wall means in said housing at a point remote from said first diaphragm and forming a chamber in said housing, a source of fluid under pressure, a passageway within said housing, said passageway leading from said source of fluid under pressure to the chamber, valve means in said passageway located between said first diaphragm and said movable wall means, a first mechanical link means connected between said valve means and said first diaphragm whereby movement of said first diaphragm under increased pressure will cause said valve means to open, and a second mechanical link means between said movable wall means and said valve means whereby an increase in pressure in said chamber will urge said valve means to tend to close and oppose the movement of said first diaphragm, and pressure responsive readout means associated with said chamber.

2. The sensor of claim 1 wherein the movable wall means comprises a second diaphragm.

3. The pressure sensor of claim 2 wherein the mechanical link means between the respective diaphragms and the valve means each comprise rod-like means carrying compression loading from the respective diaphragm to the valve head.

4. The pressure sensor of claim 2 wherein the mechanical link means between the second diaphragm and the valve head comprises a rod-like member, means connecting a first end of said rod-like member to said second diaphragm, the other end of said rod-like member bearing against said valve head.

5. The pressure sensor as specified in claim 2 and a port provided in said housing in communication with said passageway, means connecting said port to said source of fluid under pressure, said port being positioned adjacent to said second diaphragm and remotely from said valve means.

6. The pressure sensor of claim 1 wherein the valve means comprises an annular seat defined at a location where the passageway changes in size, and a valve head movable toward and away from the seat, a tubular member in said passageway, the interior of said tubular member being open to said passageway through said valve means only, the opposite end of said tubular member being open to said chamber.

7. The pressure sensor of claim 6 wherein said rod-like member is tubular and concentric with and smaller than said passageway and said tubular member is positioned inside said rod-like member.

8. The pressure sensor of claim 1 further characterized in that means are provided on the housing defining an adjustable orifice exhausting from said chamber.

9. The pressure sensor of claim 1 further characterized in that the pressure to be sensed comprises pressure within a barrel of an extruder for plastic materials, means to mount said sensor in said barrel with said first diaphragm substantially flush with an inner surface of said barrel, said valve means being positioned in said housing a distance from the first diaphragm which is less than the thickness of said barrel.

10. A pressure sensor for utilization in high pressure, high temperature environments including a housing, means at a first end of said housing comprising a first diaphragm in position to deflect in response to the pressure from said environment, a second diaphragm in said housing at a point remote from said first diaphragm, a chamber defined in said housing, said second diaphragm forming one wall of the chamber and being deflectable in response to pressure in the chamber, a source of fluid under pressure, a passageway within said housing, said passageway leading from a port connected to said source of fluid under pressure to said chamber, fluid flow control valve means in said passageway, first mechanical linkage means connected to said valve means and said first diaphragm whereby movement of said first diaphragm caused by an increase in pressure in said environment will tend to cause said valve means to open, second mechanical linkage means between said second diaphragm and said valve means whereby an increase in pressure in said chamber will urge said valve means to tend to close and oppose the movement of said first diaphragm, a control orifice leading from said chamber to permit a regulated flow of air from said chamber and thus through said valve means and said passageway to maintain an equilibrium opening of said valve means, and pressure responsive readout means associated with said chamber.

11. The combination as specified in claim 10 wherein said second mechanical linkage means from said second diaphragm to said valve means comprises a rod, means between said second diaphragm and said rod to transfer motion of the second diaphragm to the rod, said rod being positioned within a portion of said passageway.

12. The combination as specified in claim 11 wherein said valve means comprises a shoulder in said housing, and a movable valve body having a surface mating with said shoulder, said passageway further being defined by a tubular inner passageway defined within said rod opening into said second chamber, and wherein the flow from said supply of fluid under pressure goes from a passageway on the outside of said rod, through said valve means, and to the inner passageway inside said rod to said chamber.

13. The combination as specified in claim 11 wherein said valve means includes a valve body separate from said rod and wherein said rod abuts against said valve body on a first side thereof.

14. The combination as specified in claim 13 wherein said second mechanical linkage means includes a stem member fixed to said first diaphragm and said valve body and extending from said valve body in opposite direction from said rod.

15. The combination as specified in claim 14 wherein said stem member has a shoulder defined therein and abutment means defined in said housing which will collide with the shoulder on said stem member after the first diaphragm has deflected a predetermined amount in direction tending to open said valve means.

16. The combination as specified in claim 13 wherein means between said housing and said valve body to keep the valve body substantially centered with respect to the passageway.

17. The pressure sensor of claim 10 further characterized in that the second diaphragm is substantially larger than the first diaphragm.

18. A pressure sensor including a housing, means at a first end of said housing comprising a first diaphragm in position to be deflected from its normal plane due to pressure to be sensed, movable wall means in said housing at a point remote from said first diaphragm and forming a chamber in said housing, a source of fluid under pressure, a fluid passageway within said housing, said passageway communicating with said source of fluid under pressure and the chamber, positionable valve means in said passageway located between said first diaphragm and said movable wall means, a first mechanical link means connected between said valve means and said first diaphragm whereby movement of said first diaphragm under increased pressure will adjust said positionable valve means from a first position to control flow of fluid through said possageway, and a second mechanical link means between said movable wall means and said positionable valve means whereby an increase in pressure in said chamber will urge said valve means toward said first position, and pressure responsive readout means associated with said chamber.

19. A pressure sensor including a housing, means at a first end of said housing comprising a first diaphragm in position to be deflected from its normal plane due to pressure to be sensed, movable wall means in said housing at a point remote from said first diaphragm and forming a chamber in said housing, a source of fluid under pressure, a fluid passageway, said passageway communicating with said source of fluid under pressure and the chamber, valve means to control fluid flow through said passageway located closely adjacent said first diaphragm, means connected between said valve means and said first diaphragm whereby movement of said first diaphragm under increased pressure will adjust said valve means from a first position to control flow of fluid through said passageway, and cause a change of pressure in said chamber, and mechanical link force transfer means between said movable wall means and said first diaphragm to provide an opposing force on said first diaphragm.

20. A pressure sensor for utilization in high pressure, high temperature environments including a housing, means at a first end of said housing comprising a first diaphragm in position to deflect in response to the pressure from said environment, a second diaphragm in said housing at a point remote from said first diaphragm, a chamber defined in said housing, said second diaphragm forming one wall of the chamber and being deflectable in response to pressure in the chamber, a source of fluid under pressure, a passageway within said housing, said passageway communicating with said source of fluid under pressure and said chamber, fluid flow control valve means in said passageway, first mechanical linkage means connected to said valve means and said first diaphragm whereby movement of said first diaphragm caused by an increase in pressure in said environment will tend to cause said valve means to move from a first position to control flow of fluid through said passageway, second mechanical linkage means between said second diaphragm and said valve means whereby an increase in pressure in said chamber will urge said valve means toward said first position to achieve an equilibrium opening of said valve means, and pressure responsive readout means associated with said chamber.

References Cited

UNITED STATES PATENTS

| | | | |
|---|---|---|---|
| 1,938,492 | 12/1933 | Moller | 73—388 |
| 2,748,602 | 6/1956 | Weber | 73—419 |
| 3,277,721 | 11/1966 | Bader | 73—408 |

DONALD O. WOODIEL, Primary Examiner

U.S. Cl. X.R.

73—388

PO-1050
(5/69)

UNITED STATES PATENT OFFICE
CERTIFICATE OF CORRECTION

Patent No. 3,482,449      Dated December 9, 1969

Inventor(s)      Frank D. Werner

It is certified that error appears in the above-identified patent and that said Letters Patent are hereby corrected as shown below:

Column 3, line 54, "substantialy" should be --substantially--. Column 4, line 2, "dis-like" should be --disc-like--; line 18, "radically" should be --radially--. Column 6, line 1, "or" should be --of--. Column 7, line 60, "wherein" should be --and--. Column 8, line 12, "possageway" should be --passageway--.

SIGNED AND
SEALED
JUN 2 1970

(SEAL)
Attest:

Edward M. Fletcher, Jr.
Attesting Officer

WILLIAM E. SCHUYLER, JR.
Commissioner of Patents